US00RE34113E

United States Patent [19]

Miller et al.

[11] E Patent Number: Re. 34,113

[45] Reissued Date of Patent: Oct. 27, 1992

[54] WEATHERPROOF AIR CONDITIONING DISCONNECT SWITCH

[75] Inventors: Greg A. Miller; Donald H. Stoll, both of North Mankato, Minn.

[73] Assignee: General Electric Company, New York, N.Y.

[21] Appl. No.: 679,383

[22] Filed: Apr. 2, 1991

Related U.S. Patent Documents

Reissue of:

[64] Patent No.: 4,851,963
Issued: Jul. 25, 1989
Appl. No.: 232,049
Filed: Aug. 15, 1988

[51] Int. Cl.[5] ..... H02B 1/08

[52] U.S. Cl. ..... 361/356; 200/16 F; 200/51 R; 200/304; 361/360

[58] Field of Search ..... 337/8-11; 200/5 R, 16 R, 16 E, 16 F, 50 A, 50 C, 254, 51 R, 275, 51.04, 297, 304, 308, 329, 303, 331; 361/331, 334, 344, 351, 356, 358, 360, 426, 432

[56] References Cited

U.S. PATENT DOCUMENTS

| | | | |
|---|---|---|---|
| 2,641,671 | 6/1953 | Koenig | 200/16 R |
| 3,093,773 | 6/1963 | Cole | 361/376 |
| 3,743,892 | 7/1973 | Fritz | 220/24.3 |
| 3,955,709 | 5/1976 | Coley | 220/335 |
| 4,233,482 | 11/1980 | DiMarco | 200/16 D |
| 4,642,733 | 2/1987 | Schacht | 361/363 |
| 4,675,782 | 6/1987 | Hibbert | 361/356 |
| 4,785,378 | 11/1988 | Hinckley | 361/363 |
| 4,794,211 | 12/1988 | Hibbert | 200/16 F |
| 4,901,219 | 2/1990 | Erickson | 361/355 |

*Primary Examiner*—Gerald P. Tolin
*Attorney, Agent, or Firm*—Richard A. Menelly; Fred Jacob

[57] ABSTRACT

A weather-tight air conditioning disconnect switch has both plastic and metal enclosure components for low cost assembly. The exterior components include a metal case and cover whereas the interior non-electrical components are plastic-molded. One such molded plastic dead-front shields the electrical terminals within the enclosure and contains instruction and caution indicia integrally-formed on the exterior surface during the plastic molding forming process. ON - OFF indication of the switch is achieved by the orientation of the switch handle with the switch handle receiver.

15 Claims, 4 Drawing Sheets

WEATHERPROOF AIR CONDITIONING DISCONNECT SWITCH

Matter enclosed in heavy brackets [ ] appears in the original patent but forms no part of this reissue specification; matter printed in italics indicates the additions made by reissue.

BACKGROUND OF THE INVENTION

U.S. Pat. No. 4,675,782 entitled "Molded Plastic Enclosure for Disconnect Switches" describes a three-component molded plastic enclosure wherein the electric insulation to the electric fuses and other metallic plastic components multi-functionally provide support and electric insulation to the electric fuses and other metallic electrical components contained therein. When such a disconnect switch is used within air conditioning units, for example, a repair person working on the air conditioner unit must be assured that the switch remains in the "OFF" position until such work is completed. The "ON and OFF" indicia are located on opposite sides of the removable handle-connector assembly so that the "OFF-ON" condition of the switch can be confirmed by visually observing the "ON and OFF" indicia. In order for the operating handle to remain visible from the exterior of the enclosure, the door is provided with a special "Hibbert" hinge that is, a hinge that allows the door to remain open when the door is rotated past its fully opened position.

For some non-fused applications, a less expensive disconnect switch not requiring three separate enclosure components can be employed.

One such arrangement is found within U.S. Pat. No. application Ser. No. 100,506 entitled "Loop-Feed Wiring Arrangement For Electric Circuit Breakers and Switches" wherein both plastic and metal enclosure components are employed. This Application also describes a means for wiring the line and load connections from the same direction for improved safety as well as economy.

Both the aforementioned U.S. Patent and Patent Application are incorporated herein for reference purposes and should be reviewed for the advanced state of the art of disconnect switch interior component configurations and exterior enclosure construction and design.

One purpose of the instant invention is to provide a simple and inexpensive disconnect switch that employs a two-component metal-formed exterior enclosure that does not require any bolts or other fastening components and which incorporates plastic interior components for shielding, support and electrical isolation functions.

BRIEF DESCRIPTION OF THE INVENTION

The invention comprises an electric disconnect switch contained within a two-component enclosure consisting of a metal cover and a metal case wherein the cover cooperates with means integrally-formed within the case to hold the cover in an open position. A plastic dead-front shield interacts with the interior plastic pullout switch assembly and contains indicia describing the switch operating parameters and caution notices. Means are integrally-formed on the pullout switch assembly for visually indicating the switch "ON" and "ON" conditions.

DESCRIPTION OF THE PREFERRED EMBODIMENT

Figure 1:
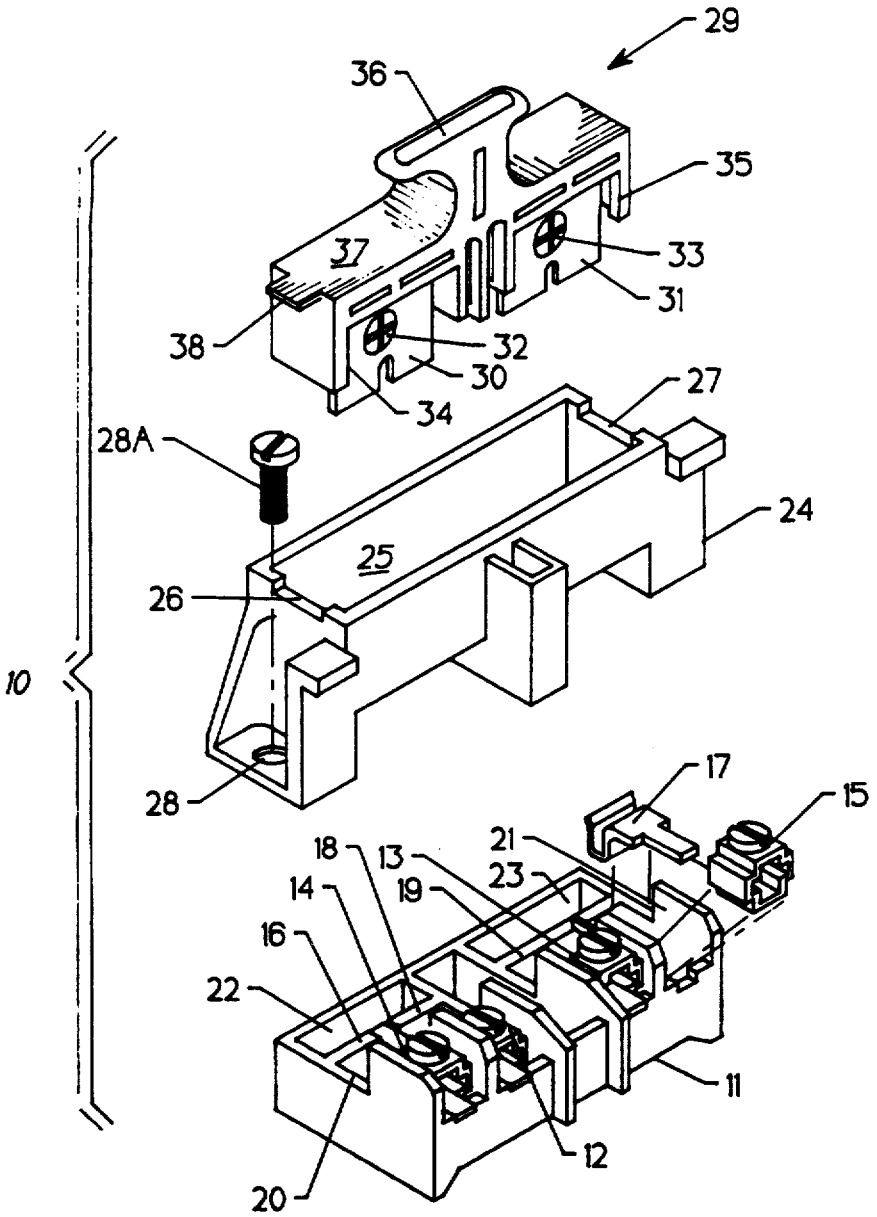
FIG. 1 is a top perspective view in isometric projection of the interior components used within the disconnect switch according to the invention.

The pullout switch assembly components 10 are shown in FIG. 1 and include an insulative plastic base 11 with means formed therein for supporting a pair of load terminal lugs 12, 13 and line terminal lugs 14, 15. The line terminal lugs are mechanically and electrically connected to a corresponding pair of line stabs 16, 17 and load stabs 18, 19 as indicated. The base also includes "active" recesses 20, 21 and "passive" recesses 22, 23 which will be discussed below in greater detail. It is suffice to note that both the line and load stabs are arranged within the active recesses. An insulative plastic guide 24 is next positioned over the base and is attached to the metallic case 39 (FIGS. 2, 4) by means of thru-holes 28, arranged on opposite sides of the case and by means of machine screws 28A. A longitudinal channel 25 formed within the guide provides access to the line and load stabs for receiving corresponding slotted blades 30, 31 which are attached to the handle 29 within corresponding recesses 34, 35 integrally-formed therein and attached thereto by means of screws 32, 33. Formed within the opposing ends of the guide are a pair of slots 26, 27 which cooperate with an indicating tab 38 formed on the handle in a manner to be described below in greater detail. The indicating tab 28 is integrally-formed within the planar surface 37 which extends upwards to and terminates in a T-shaped grip 36 to facilitate operating the handle.

Figure 2:
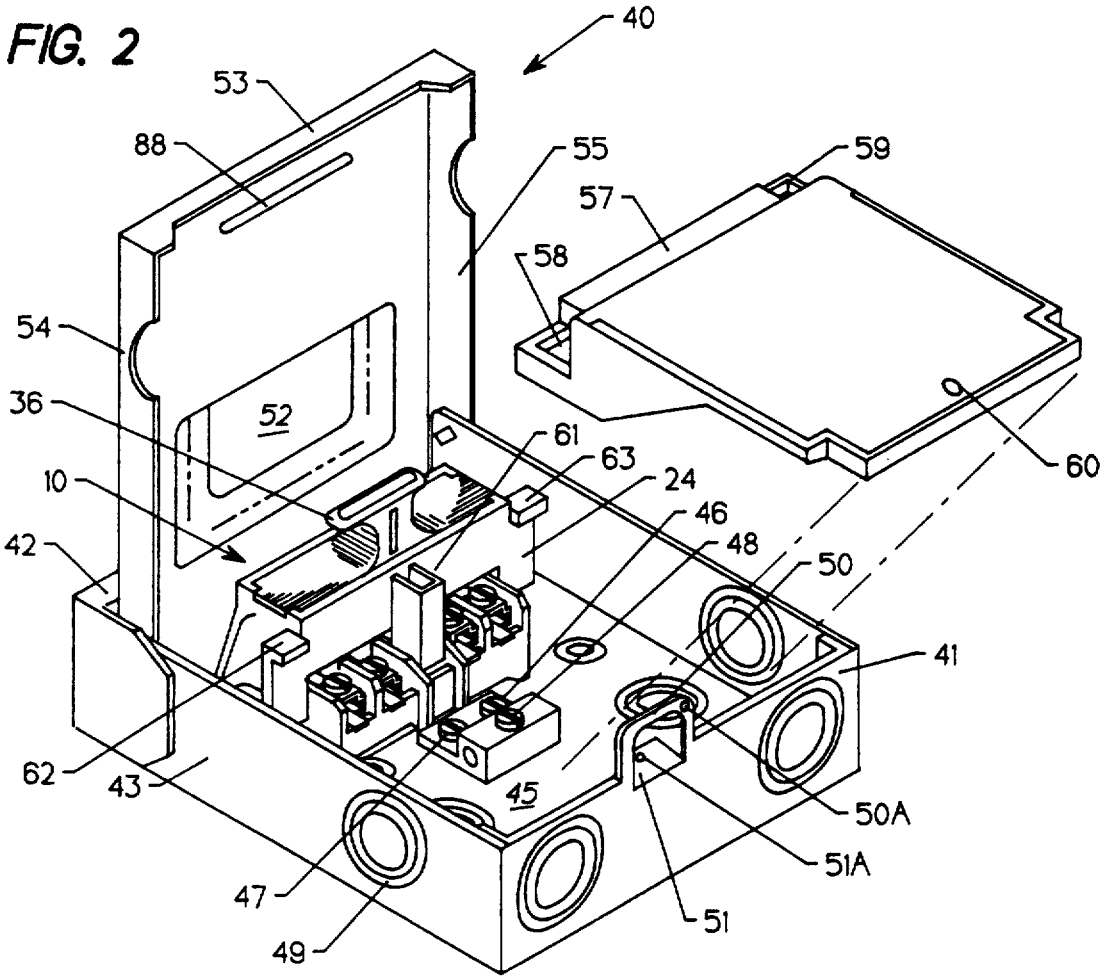
FIG. 2 is a top perspective view of the disconnect switch according to the invention with the plastic shield in isometric projection.

The interior pullout switch assembly components 10 are now depicted in FIG. 2 attached to the bottom 45 of the metallic case 39. Also attached to the bottom of the case, is the neutral assembly 46 which includes a pair of neutral terminal screws 48. The neutral terminal assembly is mechanically attached and electrically bonded to the case by means of a machine screw 47. The case is formed from a single piece of sheet metal which is shaped into a pair of upstanding sides 43-44, a front 41 and a rear 42. A plurality of knockouts 49 are cut within the front, bottom and sides as indicated. These knockouts allow for wiring access to the line and load terminals contained within the pullout switch assembly. A separate metal cover 40 is formed from a single piece of sheet metal into opposing sides 54, 55 interconnected by a front 53. An oval recess 52 is integrally-formed within the cover to provide clearance for the upstanding T-shaped grip 36. An insulative plastic dead-front or shield 56 is arranged over the electrical components on the pullout switch assembly by positioning the pair of recesses 58, 59, formed on the shield, under a corresponding pair of tabs 62, 63, formed on the guide 24, and overlaying the platform 57, formed on the shield, onto the pedestal 61. The opposite end of the shield rests on the tabs 51 which is formed within the front 41 of the case. The shield is fastened to the case by means of a thru-hole 60 formed within the shield and a threaded hole 51A through the tab. A padlock hasp 50 formed on the front of the case includes a circular protrusion 50A which moves the hasp out of the path of the front 53 of the cover 40 when the cover is being closed and the hasp traverses through the elongated slot 88 formed through the cover.

Figure 3:
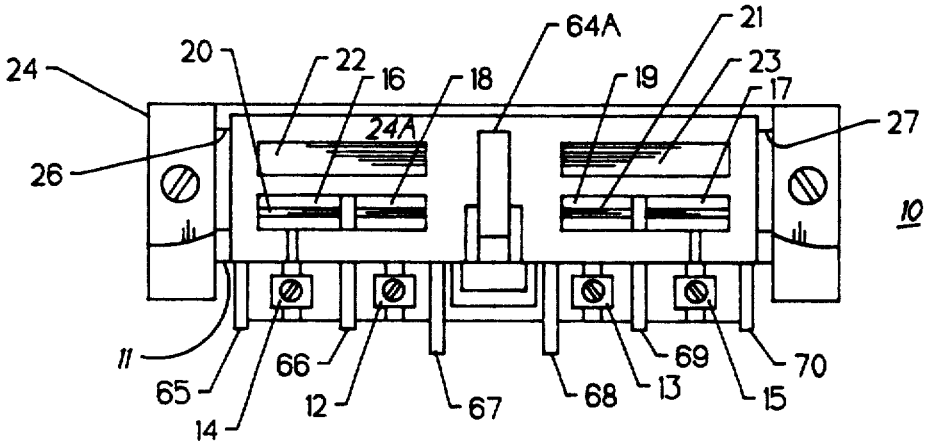
FIG. 3 is a plan view of the assembled interior components of the disconnect switch according to the invention.

The pullout switch assembly 10 is depicted in FIG. 3 with the load terminal lugs 12, 23 and the line terminal lugs 14, 15 attached to corresponding load stabs 18, 19 and line stabs 16, 17 within their respective active recesses 20, 21. Insulative plastic barriers 65–70 are integrally-formed with the base 11. The barriers 67, 68 proximate the load terminal lugs 12, 13 are marked with the word "Load" while the barriers 65, 70 proximate the line terminal lugs 14, 15 are accordingly marked "Line". The "Line" and "Load" indicia are formed integral with the forming of the base components and are permanently affixed therein. Corresponding "OFF" indicia is integrally-formed within the slot 26 and "ON" indicia is formed within the opposite slot 27, as indicated. It is noted that the passive recesses 22, 23 contain no electrical components. To provide a clear indication of the condition of the slotted blades 30, 3 of FIG. 1 with respect to the line and load stabs 16–7, 18–19, the indicating tab 38 on the handle 29 shown in FIG. 1 interacts with the slots 26, 27 in the following manner. When the handle 29 is in its "ON" condition, the slotted blades 30, 31 are inserted within the active recesses 20, 21, and electrical connection is made between the adjacent line and load stabs 16, 18 and 17, 19. The indicating tab 38 nests within slot 26 to thereby obliterate the "OFF" indicia contained therein such that the "ON" indicia contained within the opposite

27 is readily visible. In like manner, when the. handle 29 is in its "OFF" condition such that the slotted blades 30, 31 are positioned within the passive recesses 22, 23, the indicating tab 38 obliterates the "ON" indicia in slot 27 such that the "OFF" indicia within slot 26 is readily visible. Recess 64A formed in the bottom 24A of the guide 24 receives the projection 64 formed on the handle 29 to guide the insertion of the grooved blades 30, 31 within the passive recesses 22, 23.

Figure 4:
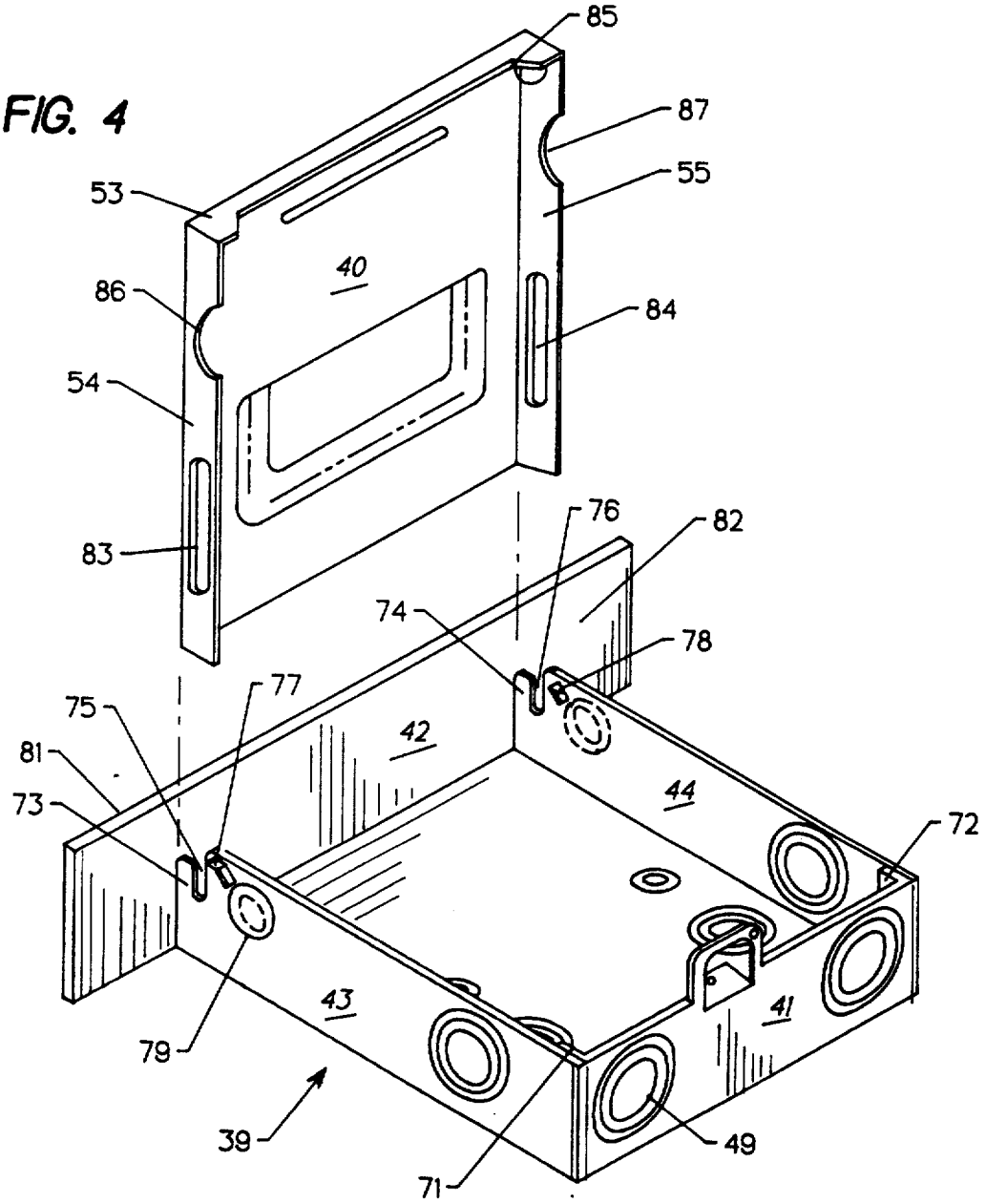
FIG. 4 is a top perspective view of the exterior enclosure cover and case according to the invention with the cover arranged in isometric projection.

The assembly of the cover 40 to the case 39 is best seen by referring now to FIG. 4 wherein the cover 40 is punched from a single piece of sheet metal and is formed into opposing cover sides 54, 55 and front 53. A pair of elongated slots 83, 84 are formed within the ends of the cover sides opposite the front 53. A slot 85 formed in the front 53 of the cover 40 allows for clearance of the cover with respect to the knockouts 49 formed on the front 41 of the case 39 and a pair of slots 86, 87 formed on the sides 54, 55 of the cover allow for clearance of the cover with respect to the knockouts formed on the sides 43, 44 of the case. This results in the use of less material for the front and sides of the cover and hence to reduced material costs. The case 39 is shaped from a single piece of sheet metal into opposing sides 43, 44 to which the front 41 is welded by means of angled ends 71, 72. The end of the case sides opposite the front, are truncated as indicated at 73, 74 and a pair of slots 75, 76 are formed at the truncated ends. A pair of tabs 77, 78 are punched within the case sides and extend outboard thereof and are captured within the slots 83, 84 to pivotally attach the cover to the case. The flaps 81, 82 extending from the ends of the rear 42, are folded over and welded to complete the box-like configuration depicted in FIG. 2. The cover 40 is snapped onto the case 39 and the pair of circular protrusions 79 and 80, formed near the truncated ends, act as guides and stops for the cover as the cover is rotated between its open and closed positions as well as providing welding surfaces for welding the flaps.

One of the important features of the invention is the retention of the cover in its open position, such as indicated in FIG. 2, so that the position of the T-shaped grip 36 and the location of the indicating tab 38 is clearly visible. As described earlier, the position of the indicating tab portrays the ON - OFF condition of the switch. To ensure that the cover remains in its open position, the cover interacts with the case as best seen by now referring to FIGS. 5A–5D.

Figure 5B:
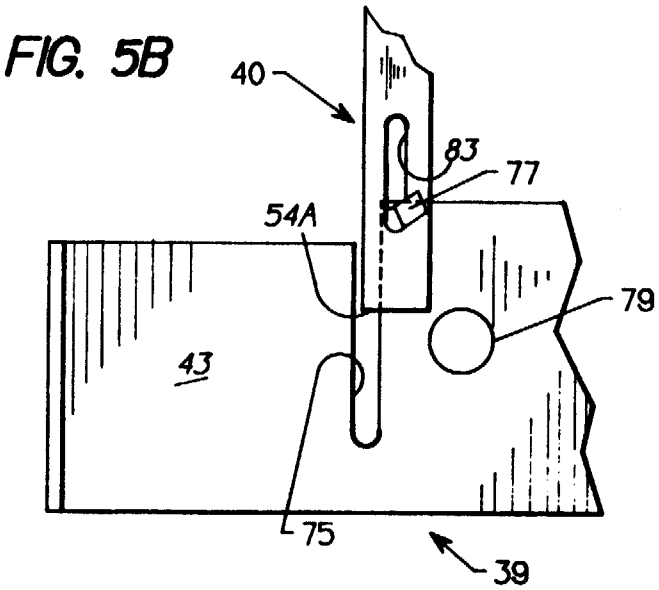
FIGS. 5A-5D are cutaway side views of a part of the exterior components of FIG. 4 detailing the lockopen features of the cover.
Figure 5D:
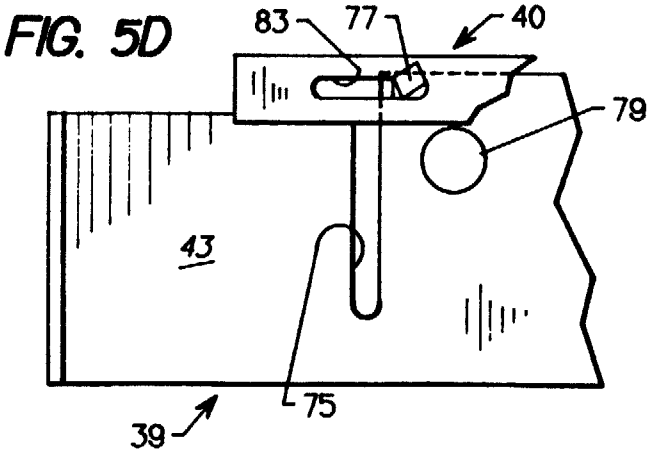
Figure 5A:
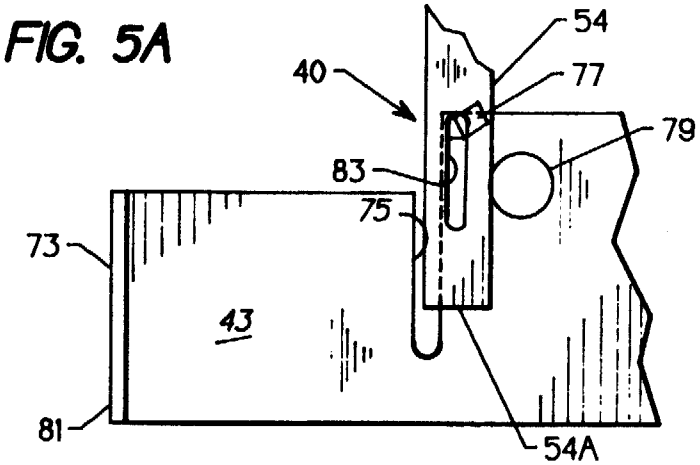
Figure 5C:
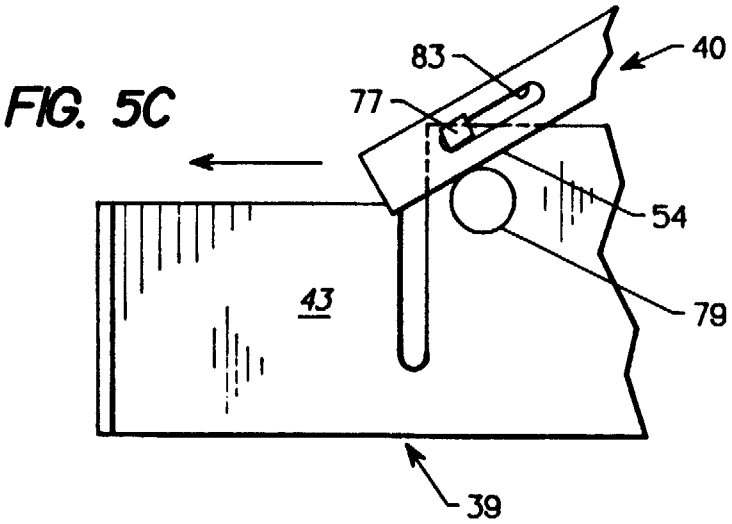

In FIG. 5A, wherein only one cover side 54 and flap 81 is visible prior to folding over. The end 54 of the cover side abuts the bottom of the slot 75 formed within the truncated end 73 of the case side 43. The tab 77 formed within the case abuts the top edge of the slot 83 formed within the cover such that the cover side is now positioned between the slot 75 and The circular protrusion 79. To rotate the cover to its closed position, the cover is moved forward such that the end 54A is lifted out from slot 75 and the tab 77 now abuts the bottom of slot 83 as shown in FIG. 5B. Rotating the cover in a clockwise direction about tab 7/ allows the cover to reach the position indicated in FIG. 5C such that the cover side 54 stops against the protrusion 79 with the tab 77 abutting the bottom of slot 83. To move the cover to its fully closed position, the cover is slid in the indicated direction along the top of the protrusion 79 until the tab 77 abuts the top edge of slot 83 as shown in FIG. 5D.

An inexpensive disconnect switch has been described herein consisting of a metal cover and case which form a weather-tight enclosure for the interior pullout switch assembly components. The pullout switch assembly components include a plastic base and guide which carry indicia to identify the line and load terminals as well as to indicate the "ON" and "OFF" condition of the switch. The cover interacts with the case to remain in an open condition such that the interior switch components are clearly visible.

Having thus described our invention, what we claim as new and desire to secure by Letters Patent is:

1. An electric disconnect switch comprising:

a metal cover and a metal case *said cover attached to said case;* a molded plastic base attached to a bottom surface of said: case;

a molded plastic handle guide positioned over said base, said base including a plurality of line and load stabs arranged under a channel formed in said handle guide; [and]

a molded plastic handle assembly including a shaped handle grip projecting from one end and a plurality of line and load blades extending from an opposite end thereof, said handle assembly being slidably arranged within said handle guide whereby said line and load blades are moved into and out of contact with said line and load stabs by operation of said handle grip; *and*

*a planar insulative shield attached to said case and arranged over said line and load stabs to prevent inadvertent contact with said line and load stabs when said switch is electrically energized.*

[2. The electric disconnect switch of claim 1 including a planar shield attached to said case bottom surface and arranged over said line and load stabs to prevent inadvertent contact with said line and load stabs when said switch is electrically energized.]

3. [The electric disconnect switch of claim 2 wherein] *An electric disconnect switch comprising:*

*a metal cover and a metal case said cover attached to said case;*

*a molded plastic base attached to a bottom surface of said case;*

*a molded plastic handle guide positioned over said base, said base including a plurality of line and load stabs arranged under a channel formed in said handle guide;*

*a molded plastic handle assembly including a shaped handle grip projecting from one end and a plurality of line and load blades extending from an opposite end thereof, said handle assembly being slidably arranged within said handle guide whereby said line and load blades are moved into and out of contact with said line and load stabs by operation of said handle grip; and*

*a planar insulative shield attached to said case and arranged over said line and load stabs to prevent inadvertent contact with said line and load stabs when said switch is electrically energized* said handle guide includes a pair of tabs extending from a top surface thereof and said shield includes a corresponding pair of recesses formed at opposite ends, said tabs being arranged within said [recesses] *recesses* supporting one end of said shield on said base.

4. The electric disconnect switch of claim 3 further including a pedestal integrally-formed on said handle guide receiving a platform on said shield intermediate said recesses.

5. The electric disconnect switch of claim [2] *1* including [a pair of slots formed on] a top surface of each side of said handle guide and an indicating tab extending from one side of said handle assembly whereby "ON - OFF" indicia [within said slots] *on said top surface* become selectively covered and exposed by said indicating tab to display the relationship between said line and load stabs and said blades.

6. The electric disconnect switch of claim 1 including upstanding barriers integrally-formed between said line and load stabs, each of said barriers containing indicia formed on a top surface to identify adjacent ones of said line and load stabs.

7. The electric disconnect switch of claim [2] *1* wherein said case comprises a single metal plate formed into a bottom piece having an upstanding front piece, upstanding rear piece and a pair of opposing upstanding side pieces.

8. The electric disconnect switch of claim 7 wherein said cover comprises a single metal plate formed into a planar top piece having a depending front piece and a pair of opposing depending said pieces.

9. The electric switch of claim 8 wherein each of said case side pieces includes a *side piece* slot formed therein extending in a plane coextensive with said case side pieces and wherein said cover side pieces are retained within said *side piece* slots when said cover is in an open position.

10. The electric disconnect switch of claim 9 wherein each of said case side pieces include a pair of *side piece* tabs projecting outboard therefrom and each of said cover side pieces include a pair of elongated *cover* slots from therein, said *side piece* tabs being captured within said elongated cover slots thereby slidingly retaining said cover to said case.

11. The electric disconnect switch of claim 10 including a pair of circular protrusions formed on said case side pieces proximate and *side piece* tabs [and providing guide means supporting said cover when said cover is moved from an open to a closed position].

12. The electric disconnect switch of claim 11 including a slotted hasp formed in said case front piece providing attachment means for a padlock.

13. The electric disconnect switch of claim 12 including a *top piece* slot formed within said cover top peices said *top piece* slot capturing said slotted hasp when said *cover* is in said closed position.

14. The electric disconnect switch of claim 13 including an angled tab formed on said case from piece and receiving an opposite end of said shield.

15. The electric disconnect switch of claim 12 wherein said slotted hasp includes a protrusion for interacting with a cover slot to move said slotted hasp away from said slot when said slot captures said slotted hasp.

*16. An electric disconnect switch comprising:*

*a metal cover and a metal case said cover attached to said case;*

*a molded plastic base attached to a bottom surface of said case;*

*a molded plastic handle guide positioned over said base, said base including a plurality of line and load stabs arranged under a channel formed in said handle guide;*

*a molded plastic handle assembly including a shaped handle grip projecting from one end and a plurality of line and load blades extending from an opposite end thereof, said handle assembly being slidably arranged within said handle guide whereby said line and load blades are moved into and out of contact with said line and load stabs by operation of said handle grip;*

*a molded plastic shield attached to said case and arranged over said line and load stabs to prevent inadvertent contact with said line and load stabs when said switch is electrically energized, said plastic shield containing instruction and caution indicia integrally-formed on an exterior surface thereof.*

* * * * *

UNITED STATES PATENT AND TRADEMARK OFFICE

CERTIFICATE OF CORRECTION

PATENT NO. : Re. 34,113

DATED : October 27, 1992

INVENTOR(S) : Miller et al.

It is certified that error appears in the above-identified patent and that said Letters Patent is hereby corrected as shown below:

Column 6, line 15, delete "from", insert --formed--

Col. 6, line 31, delete "from", insert --front--.

Signed and Sealed this

Fifth Day of October, 1993

Bruce Lehman

*Attest:*

BRUCE LEHMAN

*Attesting Officer*

*Commissioner of Patents and Trademarks*